United States Patent [19]

Kim

[11] Patent Number: 5,664,062
[45] Date of Patent: Sep. 2, 1997

[54] HIGH PERFORMANCE MAX-MIN CIRCUIT FOR A FUZZY INFERENCE ENGINE

[75] Inventor: Young-joon Kim, Suwon, Rep. of Korea

[73] Assignee: Samsung Aerospace Industries, Ltd., Kyeongsangnam-do, Rep. of Korea

[21] Appl. No.: 140,462

[22] Filed: Oct. 25, 1993

[30] Foreign Application Priority Data

Dec. 30, 1992 [KR] Rep. of Korea .................. 1992-26738

[51] Int. Cl.$^6$ ........................................................ G06F 9/44
[52] U.S. Cl. ............................. 395/3; 395/51; 395/61
[58] Field of Search .......................... 395/3, 61, 51; 364/DIG. 1

[56] References Cited

U.S. PATENT DOCUMENTS

| | | | |
|---|---|---|---|
| 4,875,184 | 10/1989 | Yamakawa | 395/3 |
| 5,126,600 | 6/1992 | Zhang | 395/3 |
| 5,204,935 | 4/1993 | Mihara et al. | 395/3 |
| 5,231,335 | 7/1993 | Mega et al. | 395/3 |
| 5,299,283 | 3/1994 | Hamamoto | 395/3 |
| 5,359,697 | 10/1994 | Smith et al. | 395/3 |
| 5,363,472 | 11/1994 | Hisano | 395/3 |
| 5,375,250 | 12/1994 | Van den Heuval | 395/800 |

*Primary Examiner*—George B. Davis
*Attorney, Agent, or Firm*—Finnegan, Henderson, Farabow, Garrett & Dunner, L.L.P.

[57] ABSTRACT

A Max-Min processing circuit for a Fuzzy controller includes using a pipe lined architecture. The circuit includes a first memory initialized with input values of first dimensional information, a second memory initialized with label matrixes of second dimensional informations as the number of control rules×the number of channels, and a third memory for generating membership signals of a label determined by signals of the first memory and the second memory. The circuit generates minimum values by comparing the membership signals of the third memory in sequence, and maximum values by comparing the minimum values in sequence.

4 Claims, 4 Drawing Sheets

HIGH PERFORMANCE MAX-MIN CIRCUIT FOR A FUZZY INFERENCE ENGINE

BACKGROUND OF THE INVENTION

1. Field of the Invention

The present invention relates generally to an inference engine, and more particularly, to a Max-Min processing circuit of a Fuzzy inference engine.

2. Description of the Related Art

An automatic controller actuates a controlled system by maintaining an error between a desired value and output value to be as small as possible. Types of controllers include a PID (Proportional Integral-Derivative) controller, an Optimal Controller, an Adaptive controller, a Variable Structure System (VSS) and a Neural Network.

Fuzzy control theory was introduced when Prof. Zadeh of the United States contributed an article to "Information & Control" in 1965. Although Fuzzy theory was initially treated with indifference, it began to attract public attention in 1974 when Prof. Mamdani of Great Britain obtained good results by applying Fuzzy theory to a steam engine that failed to realize an anticipated result with a generally known PID controller and Optimal controller.

Fuzzy control determines a proper manipulated variable with respect to an input through Fuzzy inference by representing a skilled operator's experience with Fuzzy sets and control rules.

A Fuzzy logic for Fuzzy control employs the following operations:

Fuzzy Negative $$\mu(NOT\ A)\ (X)=1-\mu_A(X)$$

In above formula, $\mu$ is defined as a membership function, and the letter A means a certain set and X is an element. For example, the formula $\mu_A(X)=0.3$ means that a membership for an element X to be a member of Set A is 0.3.

Fuzzy AND logic

Fuzzy AND logic is generalized by T-norm and defined as follows:

T: $[0,1]\times[0,1]\rightarrow[0,1]$ (1) $T(x,1)=x$, $T(x,0)=0$ (boundary condition)

(2) IF $x1\leq x2$ THEN $T(x1,y)\leq T(x2,y)$(monotonousness)

(3) $T(x,y)=T(y,x)$ (commutative law)

(4) $T\{x,\ T(y,z)\}=T\{T(x,y),\ z\}$(associative law)

That is to say, among operators that make a real number between two types of 0 and 1 translate into a real number between 0 and 1, the above expressed operator is defined as T-norm that satisfies boundary condition, monotonousness, commutativeness and associativeness.

T-norm applied exemplarily is:

$$\mu_{(A\ AND\ B)}\ (x)=MIN(\mu_A(x),\mu_B(x))$$

This formula is called MIN operation and means that minimum value (worse value) of both is selected.

Fuzzy OR logic

Fuzzy OR logic is generalized by S-norm and defined as follows:

S: $[0,1]\times[0,1]\rightarrow[0,1]$ (1) $S(x,1)=1$, $S(x,0)=x$ (2) IF $x1\leq x2$ THEN $S(x1,y)\leq S(x2,y)$ (3) $S(x,y)=S(y,x)$ (4) $S\{x,\ S(y,z)\}=S\{S(x,y),\ z\}$ S-norm applied exemplarily is:

$$\mu_{(A\ OR\ B)}\ (X)=MAX(\mu_A(x),\mu_B(x))$$

This formula is called as MAX operation and means that maximum value (better value) of both is selected.

Fuzzy Relation

The method of obtaining a membership of Fuzzy relation is defined as follows:

$$\mu R(x,y)=MIN(\mu_A(x),\mu_B(y))$$

An important principle of Fuzzy theory is Fuzzy inference, concluding a new fact from already known dependence of effect on cause. Fuzzy inference is chiefly formed as a control rule (or inference rule), such as [IF (conditional clause), THEN (conclusive clause)]. And a conditional clause can be subdivided as [conditional clause 1 AND conditional clause 2], the AND used here means the AND used in Fuzzy AND logic.

An exemplary water temperature control method for an electrically heated rice cooker using Fuzzy control rules will now be described.

a first control rule

[IF water is warm AND temperature is regular THEN heater power shall be medium]

a second control rule

[IF water is tepid AND temperature is a little rising THEN heater power shall be great]

The Fuzzy sets such as 'warm' and 'tepid' in the above control rules may be defined as shown FIG. 1. When a current water temperature is 12° C. and a marginal temperature change is 04., it is inferred hereinafter how great the power of a heater shall be.

FIG. 1 shows a conceptional view of Fuzzy inference.

At first, above mentioned first control rule and second control rule can also be expressed as;

a first control rule

[IF (water temperature=warm) AND (change of temperature=regular) THEN (heater power=medium)]

a second control rule

[IF (water temperature=tepid) AND (change of temperature=a little rising) THEN (heater power=great)]

In these rules, 'water temperature', 'change of temperature', etc., are 'channels', and 'warm', 'tepid', 'regular', 'a little rising', etc., are 'labels' or 'fuzzy sets'.

FIG. 1 shows labels of 'warm' and 'tepid', in a channel of water temperature have triangle shaped membership functions respectively. A membership function of a label can also be defined as bell-shape, Gaussian function or right angled triangle shape in accordance with a characteristics of a certain label.

In the first control rule of FIG. 1, the current temperature 12° C. has a membership of 0.2 in a Fuzzy set of 'warm', and the change of temperature 0.4 has a membership of 0.6 in a Fuzzy set of 'regular'. If a minimum value is selected between two memberships (i.e., current temperature=0.2, change of temperature=0.6) according to Fuzzy AND logic, there can be obtained an outcome value 0.2, which implies that a Fuzzy set of 'medium of heater power' is obtained.

In the same manner, in the second control rule, the current temperature 12° C. has a membership of 0.8 in a Fuzzy set of 'tepid' and the change of temperature 0.4 has a membership 0.8 in a Fuzzy set of 'a little rising'. If a minimum value is selected between two memberships (i.e., current temperature =0.8, change of temperature=0.4) according to Fuzzy AND logic, an outcome value of 0.4 is obtained which implies that a Fuzzy set of 'great of heater' is obtained.

A Fuzzy set can be inferred by applying Fuzzy OR logic to the consequences of the first control rule and the second control rule, as shown in FIG. 1.

Defuzzify operation obtains a usable quantity from a last inferred consequent part Fuzzy set. Defuzzification methods include a Maximum method of selecting the center of a Fuzzy variable having maximum membership, a medium value selecting method, and a center of gravity method. Intuitively, the most rational method is the center of gravity method, a widely used Defuzzification method. The center of gravity method selects an element corresponding to a centroid of a last inferred Fuzzy set. According to the center of gravity method, an output value of heater power 56.4 W is obtained from the last inferred Fuzzy set shown in FIG. 1.

Consequently, applying the first control rule and the second control rule, the output value of heater power 56.4 W is inferred from the current temperature 12° C. and the temperature change 0.4.

A Fuzzy inference/defuzzification method used most frequently is MAX-MIN/center of gravity method suggested by Prof. Mamdani of Great Britain. Currently, other Fuzzy inference methods are known such as an arithmetical sum-integration-centroid method or a simplification method as well as MAX-MIN centroid method.

A MAX-MIN method for a Fuzzy controller will now be described.

$$\mu(z) = \underset{m}{MAX} [MIN \{MIN (\mu xn(x0), \mu yn(y0)), \mu zn(z)\}]$$

| | | |
|---|---|---|
| control rule | : | IF (x=xn) AND (Y=yn) THEN (Z=zn) |
| x0, y0 | : | input value |
| μ | : | correlation value |
| m | : | the number of control rules |
| n | : | the number of channels |

As a method for realizing the MAX-MIN algorithm actually, a software method, a look-up table type method or a hardware method of inference engine have been proposed.

The software method obtains an aimed output value with an algorithm, and the look-up table type method operates to provide rapid inference by referring to a look-up table, such as a Read Only Memory (ROM), where all outputs for all possible inputs inferred with the Fuzzy inference algorithm are stored.

The hardware inference engine method may be realized with a general purpose inference algorithm hardware for processing large amounts of data for various output or input channels and MAX-MIN operations. The inference algorithm hardware architecture determines the capacity of a Fuzzy controller.

Each method discussed above has disadvantages.

In the software method, the operating speed may be too slow for a system requiring rapid inference, because a software implementation of a MAX-MIN algorithm inevitably uses many input/output values and data-bases.

In the look-up table type method, the size of ROM is determined by the number of input channels and ranges of input value, making it difficult to realize a Fuzzy controller when the range of input values is 0–255 and the number of input channels is more than 3 (i.e., the size of ROM :16 G bytes).

In the hardware inference engine method of making a Fuzzy inference hardware, there are two process types: a random process and a sequence process of channels and rules. The random process can provide highly efficient capacity but is costly. On the other hand, the sequence process can not provide highly efficient capacity of a Fuzzy controller.

SUMMARY OF THE INVENTION

Accordingly, the object of the present invention is to provide a high performance, Max-Min processing circuit for a Fuzzy controller, a pipeline structure for enhancing the capacity of a Fuzzy controller. The Fuzzy controller stores inputs of every channel and information referring output values based on the inputs in memories, and uses the memories efficiently.

To achieve this and other objects of the present invention, a circuit for a Fuzzy controller comprises a circuit for a Fuzzy controller comprising counter means for generating an address signal; first memory means for providing a first memory output in response to the address signal; second memory means for providing a second memory output in response to the address signal and first memory output; and means for providing one or more minimum values, each minimum value collectively representing one or more second memory outputs provided by the second memory means during a given time period, and for providing a maximum value representing the one or more minimum values.

DETAILED DESCRIPTION OF THE PREFERRED EMBODIMENT

Figure 1:
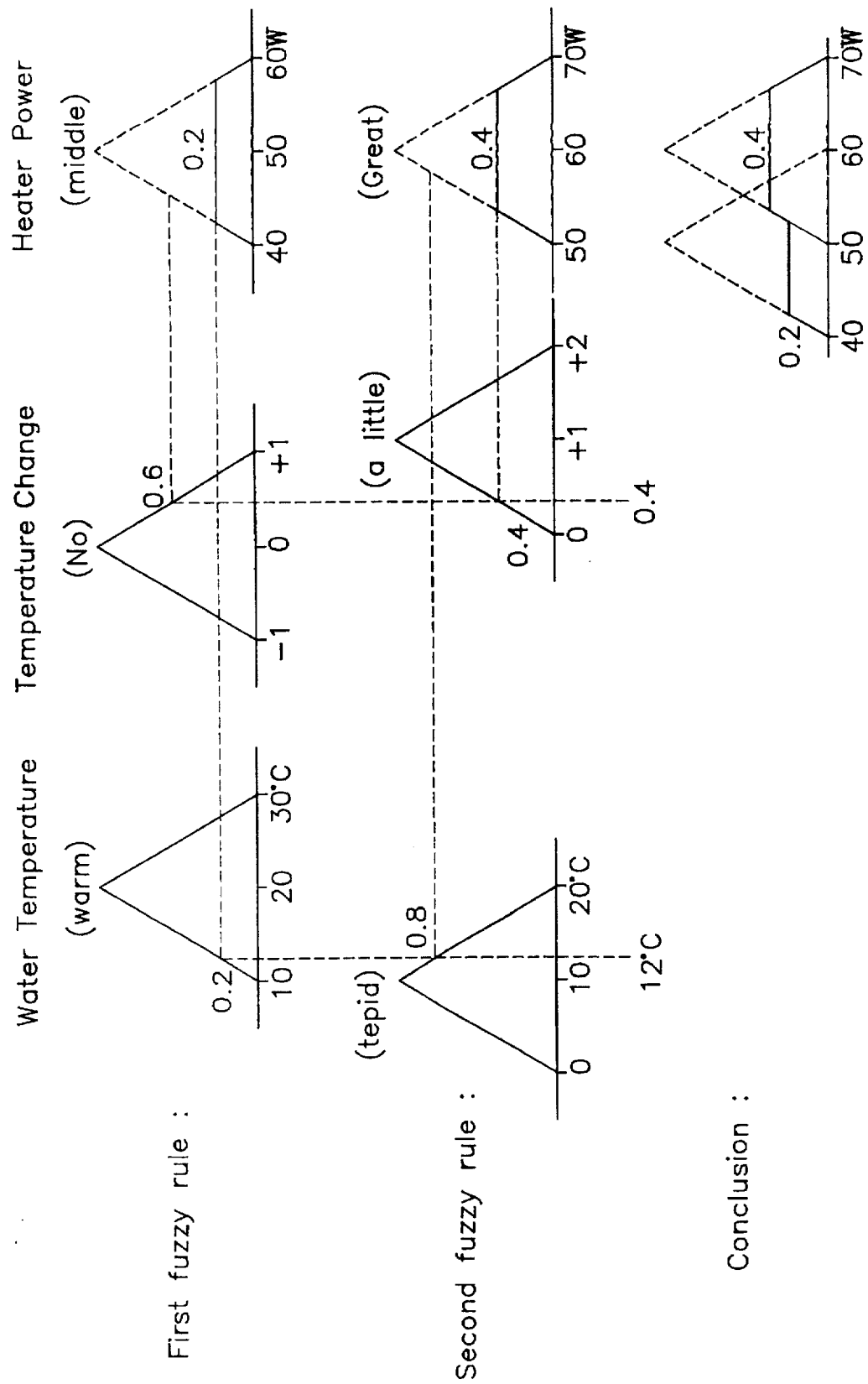
FIG. 1 illustrates the concept of Fuzzy inference.
Figure 2:
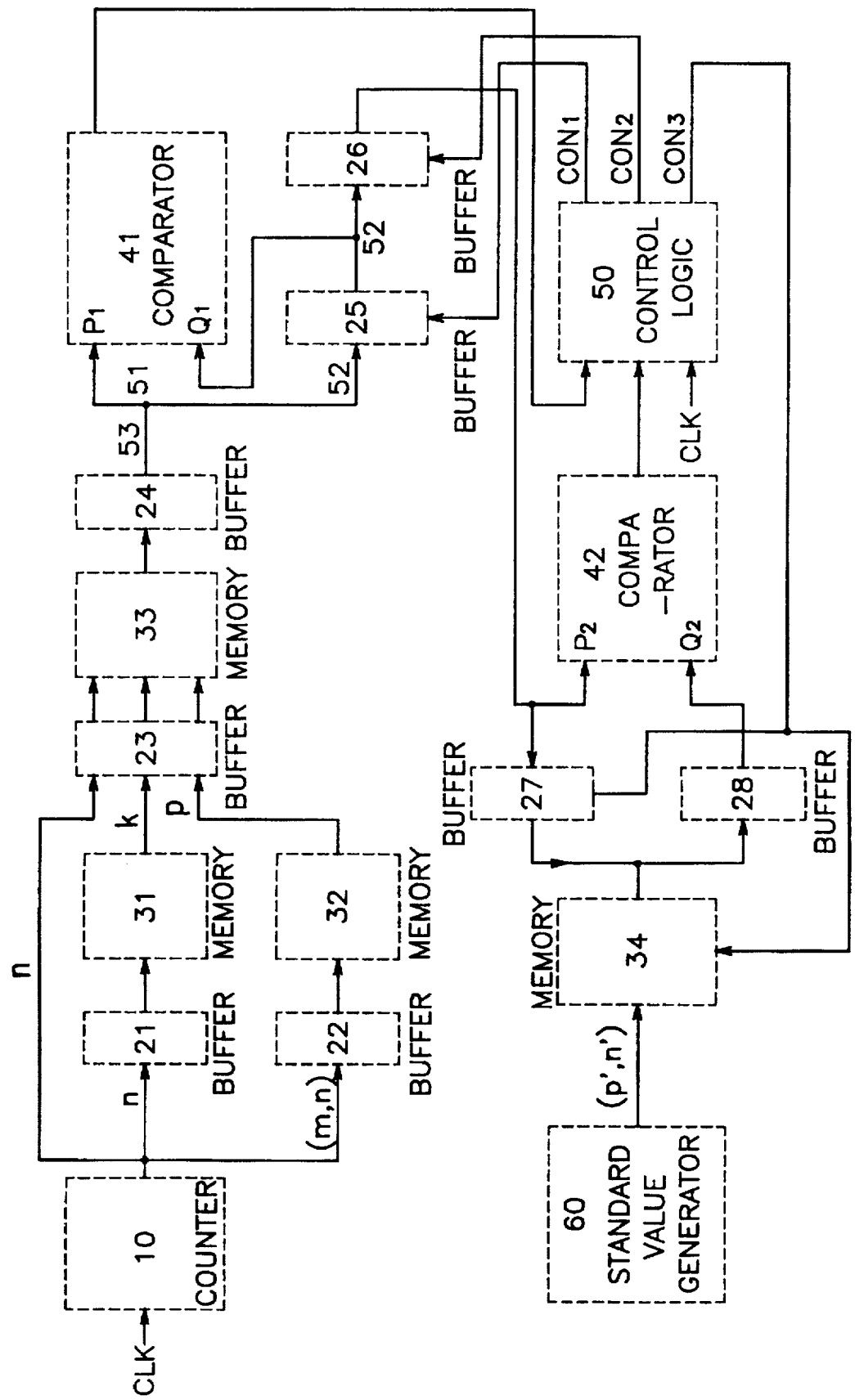
FIG. 2 is a block diagram of a pipe-lined, Max-Min processing circuit of Fuzzy controller in accordance with a preferred embodiment of the present invention.

FIG. 2 shows a block diagram of a pipe-lined, Max-Min processing circuit of a Fuzzy controller in accordance with the preferred embodiment of the present invention. Memories 31, 32, 33, and 34, store inputs and infer information based on the inputs.

Figure 4A:
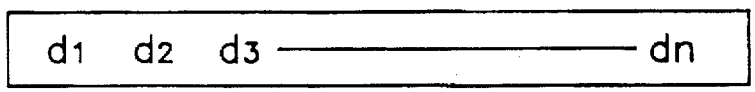
FIGS. 4A, 4B, and 4C are views of memories used in this preferred embodiment.
Figure 4B:
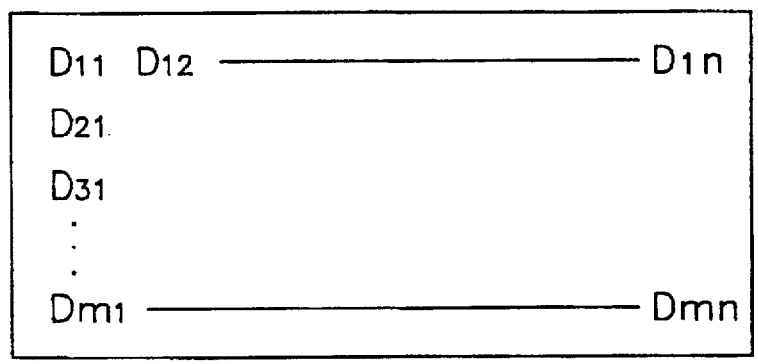
Figure 4C:
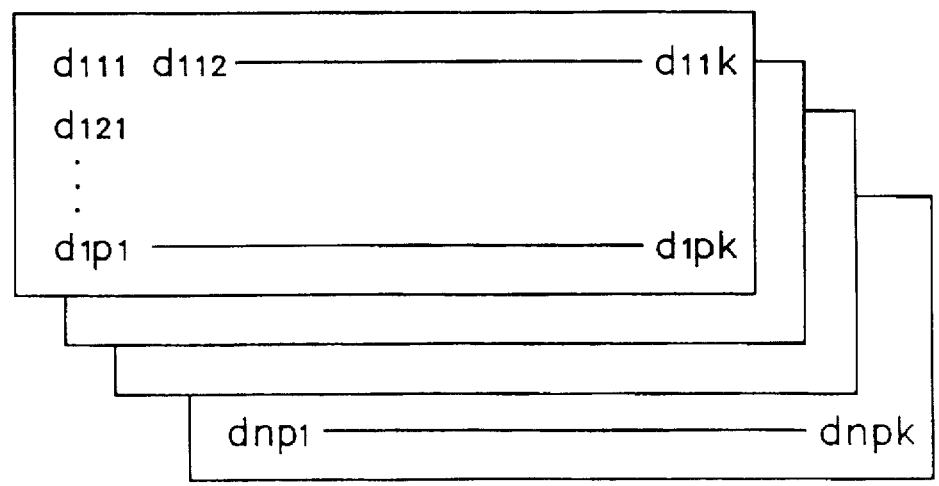

Memory 31 stores first dimensional information of each input channels as shown in FIG. 4A. Memory 32 stores second dimensional information of each input channels as shown in FIG. 4B. Memory 33 stores third dimensional information of each input channel as FIG. 4C. Memory 34 generates stored second dimensional information in accordance with output signal (p',n') of the standard value generator 60, or stores second dimensional information from a buffer 27 in accordance with RD/WR control signal CON3.

Counter 10 generates binary digits composed of (m.n) bits in response to a clock signal. The first dimensional informations are read from memory 31 in accordance with output values (n) of the counter 10 and the second dimensional informations are read from memory 32 in accordance with output values (m.n) of the counter 10.

Comparator 41 selects a minimum value and comparator 42 selects a maximum value. Comparator 41 compares one signal (P1) that is first dimensional information of the generates of memory 33, and another signal (Q1) that is a minimum value stored at a buffer 25 temporarily. Comparator 42 compares one signal (P2) that is a minimum value stored at a buffer 26 temporarily, and another signal (Q2) that is an output value of memory 34.

Buffer 21 temporarily stores output signal (n) from the counter 10. Buffer 22 temporarily stores output signal (m,n) of the counter 10. Buffer 23 temporarily stores output signal (n) of the counter 10 and output values (k,p) of memory 31 and memory 32. Buffer 24 temporarily stores output values of memory 33.

Buffer 25 stores a minimum value available while comparator 41 compares two input values for n times, in response to a first control signal (CON1) of control logic 50.

Buffer 26 temporarily stores the minimum value stored in buffer 25 in response to a second control signal (CON2) of control logic 50 when the counter 10 counts n times and adds 1 to m.

Buffer 27 temporarily stores an output value of buffer 26 for the fourth memory 34 in response to the third control signal (CON3) of control logic 50. Control logic 50 generates CON3 when comparator 42 indicates that the output value of buffer 26 is larger.

Buffer 28 temporarily stores an output value of memory 34 in accordance with an output value (p',n') of the standard value generator 60, to apply the stored value to the Q2 input terminal of comparator 42.

The control logic 50 controls general operations of the Max-Min process circuit. Control logic 50 generates the first control signal (CON1) to make buffer 25 output the stored minimum value, in response to the output signal of the first comparator 41 while the clock signal is inputted n times, and generates the second control signal (CON2) to make buffer 26 output the stored information when the count 10 count n times and adds 1 to m.

Control logic 50 generates the third control signal (CON3) to enable the seventh buffer 27 to concurrently control RD/WR operations of memory 34 in accordance with the output signal of the second comparator 42. In a writing operation of memory 34, control logic 50 makes memory 34 store the output signal of buffer 26 as a maximum value. In a reading operation of memory 34, control logic 50 makes memory 34 output second dimensional information through buffer 28 in accordance with the output signal (p',n') of the standard value generator 60.

The operating process of the preferred embodiment of the present invention will now be described.

Counter 10 starts counting when the clock signal is applied. The output value (m,n) is applied to memory 31 and memory 32 through buffer 21 and buffer 22. The lower n bits of the output value of the counter 10 is applied to the memory 31 through buffer 21 and the whole (m,n) bit is applied to the second memory 32 through the second buffer 22.

Each of memory 31 and memory 32 generates respectively the first dimensional information ($d_1$–$d_n$) and the second dimensional information ($D_{11}$–$D_{mn}$) that are stored at each address determined by counter 10 as shown in FIG. 4A and 4B. The first dimensional information ($d_1$–$d_n$), the second dimensional information ($D_{11}$–$D_{mn}$), and the output value (m,n) of the counter 10 are applied to memory 33 through buffer 23.

The first dimensional information ($d_1$–$d_n$) stored in memory 31 represents an input value, and the second dimensional information ($D_{11}$–$D_{mn}$) stored in memory 32 represents a label matrix formed as m (the number of control rules)×n (the number of channels).

Memory 33 generates the third dimensional information ($d_{111}$–$d_{npk}$) in accordance with a signal applied through buffer 23, and the output signal is applied to one input terminal (P1) of comparator 41 through buffer 24.

In the third dimensional information ($d_{111}$–$d_{npk}$) of memory 33 are stored label membership functions of respective channels of control rules. Accordingly a membership of an input of memory 31 with respect to a label determined by output values of memory 32 is outputted from the third dimensional information ($d_{111}$–$d_{npk}$) of memory 33.

Comparator 41 compares an output value (i.e., a certain membership) with an output value applied from buffer 25 through the other input terminal (Q1), and generates and applies a comparison signal to control logic 50.

Buffer 25 stores a previous membership signal of the third memory 33.

If the output value of memory 33 is smaller than that of buffer 25, control logic 50 generates and applies the first control signal (CON1) to buffer 25 to make buffer 25 store the new output value of memory 33. If the output value of memory 33 is larger than that of buffer 25, buffer 25 retains its value. Accordingly buffer 25 stores the minimum of the membership values of memory 33.

After comparator 41 executes comparing operations n times, the counter 10 adds 1 to m, control logic 50 generates and applies the second control signal (CON2) to buffer 26 to make buffer 26 apply the minimum for n times to the P2 input of comparator 42.

An accumulated value that is stored at an address of memory 34 determined by output signal (p',n') of standard value generator 60 is applied to the Q2 input of comparator 42. Comparator 42 compares a signal of buffer 26 from the P2 input with the accumulated value from the Q2 input.

If the output value of memory 34 is smaller than that of buffer 26, control logic 50 generates and applies the third control signal (CON3) to memory 34 to make memory 34 store the output value of buffer 26, applied through buffer 27, at an address determined by standard value generator 60.

Accordingly, memory 34 stores the maximum of output values of buffer 26.

Each time m increments, the process above is repeated for another control rule. Thus, memory 34 stores the Max-Min value calculated according to every control rules to realize the Fuzzy inference.

Thus, the preferred embodiment of the present invention substantially improves processing speed with a pipe lining technique that, after storing inputs of every channel and information inferring outputs in memories, and actuating the memories with counter 10, processes data outputted successively from memories concurrently. Thus, an increase of channels and control rules has a limited effect on a processing time.

Figure 3A:
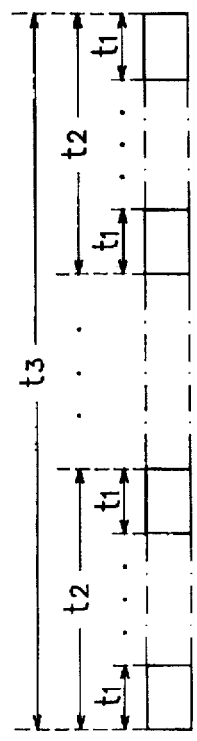
FIGS. 3A, 3B, 3C, and 3D illustrate a comparison of a pipe-lined processing with sequential processing of third dimensional data.
Figure 3B:
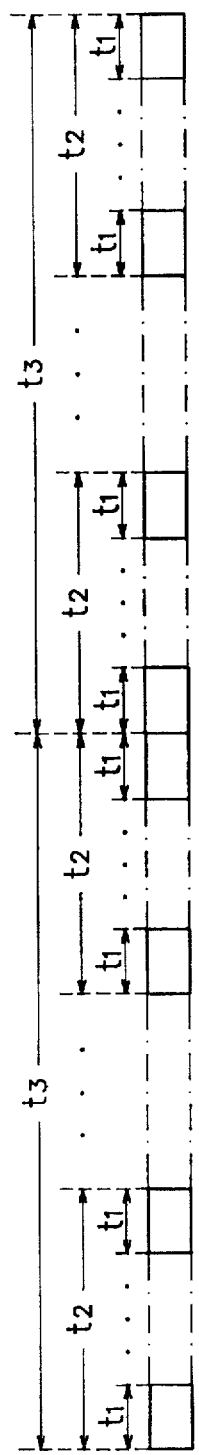
Figure 3D:
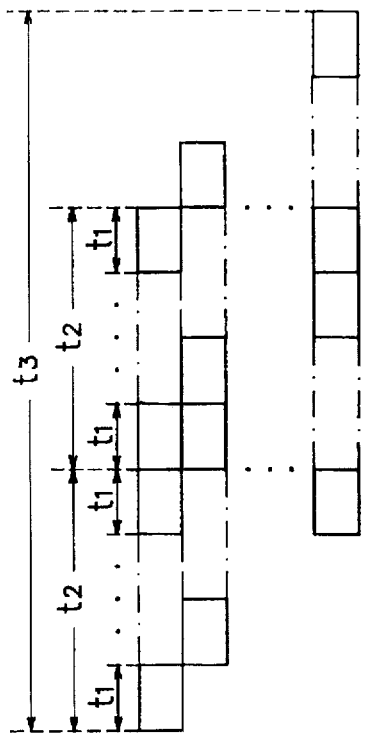
Figure 3C:
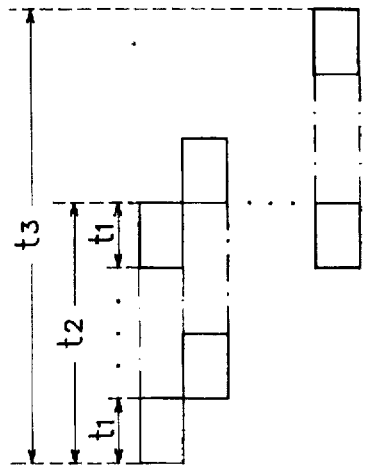

As FIG. 3C and 3D show, when processing third dimensional data such as (X,Y,Z), although the number of top elements is increased, only the processing time of basic elements is increased.

FIGS. 3A and 3D illustrate a comparison of pipe lining processing with sequential processing of third dimensional data, comparing the necessary time of a sequential process with that of pipe lining process of third dimensional data, assuming, in a third dimension (X,Y,Z), the number of X is k and the necessary time of one of X is $t_1$, the number of Y is m and the necessary time of one of Y it $T_2$, and the total necessary time is $t_3$.

If Z is 1, in a sequential process the total necessary time $t_3$ is $(m \times k \times t_1)$ as shown in FIG. 3A, and in a process of a Max-Min process circuit of a Fuzzy controller using the pipe lining of the preferred embodiment of the present invention the total necessary time $t_3$ is $\{k+m-1\} \times t_1$, as illustrated in FIG. 3C.

In addition, if Z is 2, in a sequence process the total necessary is $2 \times t_3 = (2 \times m \times k \times t_1)$ as FIG. 3B shows, and in a process of a Max-Min process circuit of a Fuzzy controller using the pipe lining of the preferred embodiment of the present invention as shown in FIG. 3D the total necessary time is $t_3 = \{(k-1+2 \times m) \times t_1\}$ when Z and Y are independent of each other, additionally, the total necessary time is $t_3 = 2 \times (k-1+m) \times t_1$ when Z and Y are dependent on each other.

According to the preferred embodiment of the present invention described above, with the Fuzzy inference algorithm hardware having the disclosed pipe lining, the Max-Min process circuit of a Fuzzy controller can improve the processing speed with relatively few components and can efficiently process more inputs and outputs, a wider range of inputs, and more control rules.

What is claimed is:

1. A Fuzzy controller circuit comprising:

counter means for generating an address signal;

first memory means for providing a first memory output signal in response to said address signal;

second memory means for providing a second memory output signal in response to said address signal and said first memory output signal; and means for outputting one or more minimum-value signals, each minimum-value signal representing a signal having the lowest value of one or more second memory output signals received from said second memory means during a given time period, and for outputting a maximum-value signal representing a signal having the highest value of said one or more minimum-value signals;

said means for outputting further comprising:

a first buffer for storing the second memory output signal in response to a first comparison signal, the first buffer having a first buffer output signal;

a first comparator for generating the first comparison signal when the second memory output signal is smaller than the first buffer output signal;

a second buffer for storing the first buffer output signal in accordance with a clock signal, the second buffer having a second buffer output signal;

an address generator for generating a second address signal;

auxiliary memory means, having an address input for inputting the second address signal and for storing the second buffer output signal in accordance with a second comparison signal, the auxiliary memory means having an auxiliary memory output signal; and a second comparator for generating the second comparison signal when an auxiliary memory output signal is smaller than the second buffer output signal.

2. A Fuzzy controller circuit comprising:

a counter for generating an address signal in response to a clock signal;

a first memory, having an address input for inputting the address signal, and having an output for generating a first memory signal, the first memory being initialized to contain input values;

a second memory, having an address input for inputting the address signal, and having an output for generating a second memory signal, the second memory being initialized to contain R×C items of label information, wherein R is a number of control rules and C is a number of channels;

a third memory, having an address input for inputting the address signal, the first memory signal, and the second memory signal, and having an output for generating membership signals; and means for generating minimum value signals by sequentially comparing the membership signals during a given time period and selecting a membership signal with the lowest value as a minimum-value signal for that time period, and for generating maximum-value signals by sequentially comparing the minimum-value signals for the time periods with each other and selecting the minimum-value signal with the highest value as a maximum-value signal;

the means for generating further comprising:

a first buffer for storing the membership signals of the third memory in response to a first control signal;

a first comparator for generating a first comparison signal when the membership signal of the third memory is smaller than the membership signal of the first buffer;

a second buffer for storing the membership signal of the first buffer in accordance with a second control signal;

a fourth memory for storing a membership signal of the second buffer in accordance with a third control signal when the membership signal of the second buffer is larger than an initially stored signal;

a second comparator for generating a second comparison signal when the membership signal of the fourth memory is smaller than the membership signal of the second buffer;

means for generating the first control signal in accordance with the first comparison signal, for generating the second control signal in accordance with the clock signal and for generating the third control signal in accordance with the second comparison signal; and a standard value generator for appointing addresses of the fourth memory.

3. The circuit of claim 2, wherein the first, second, and third memories each have a data input, and the circuit further comprises:

a first buffer, coupled to the data input of the first memory, for storing the address signal;

a second buffer, coupled to the data input of the second memory, for storing the address signal;

a third buffer, coupled to the data input of the third memory, for storing the address signal, the first memory signal and the second memory signal; and a fourth buffer for storing membership signals of the third memory.

4. The circuit of claim 2, wherein the generating means generates the third control signal with output value of the first buffer in case that the first control signal is outputted n times.

* * * * *